A. M. MATTICE.
SHAFT BEARING.
APPLICATION FILED APR. 14, 1904.

1,028,122.

Patented June 4, 1912.
2 SHEETS—SHEET 1.

WITNESSES:
C. L. Belcher
Otto S. Schairer.

INVENTOR
Asa M. Mattice
BY
ATTORNEY

A. M. MATTICE.
SHAFT BEARING.
APPLICATION FILED APR. 14, 1904.

1,028,122.

Patented June 4, 1912.

2 SHEETS—SHEET 2.

WITNESSES:
C. L. Belcher
Otto S. Schairer

INVENTOR
Asa M. Mattice
BY
Wesley G. Carr
ATTORNEYS

UNITED STATES PATENT OFFICE.

ASA M. MATTICE, OF PITTSBURGH, PENNSYLVANIA, ASSIGNOR TO WESTINGHOUSE ELECTRIC & MANUFACTURING COMPANY, A CORPORATION OF PENNSYLVANIA.

SHAFT-BEARING.

1,028,122. Specification of Letters Patent. Patented June 4, 1912.

Application filed April 14, 1904. Serial No. 203,223.

*To all whom it may concern:*

Be it known that I, ASA M. MATTICE, a citizen of the United States, and a resident of Pittsburgh, in the county of Allegheny and State of Pennsylvania, have invented a new and useful Improvement in Shaft-Bearings, of which the following is a specification.

My invention relates to shaft or axle bearings, and particularly to bearings for the armature shafts of electric motors which are employed for the propulsion of railway vehicles and for similar purposes.

My invention has for its object to provide a bearing of simple construction, which affords convenient and efficient means for lubrication and which may be firmly secured in position in the field magnet frame of a motor.

Among the various types of bearings for the armature shafts of electric railway motors, is one having a collar of bearing metal inclosed in a housing which is provided with a chamber or chambers containing a lubricant and absorbent material so disposed as to make contact with exposed portions of the shaft. These housings have usually been secured in position between the two halves of the field magnet frame of the motor by means of annular rings which were seated in corresponding annular grooves in the field magnet frame, dowel pins being provided to prevent rotation of the housings. Such a construction is defective, for the reason that the bearing housings become loose if they are not properly fitted to the field magnet frame or if the two halves of the frame are not firmly bolted together. The bearings and housings heretofore devised have also been complicated and not readily accessible.

A bearing housing constructed in accordance with my invention does not depend upon the clamping together of the two halves of the field magnet frame in order to secure it in position, since it is bolted to one half of the frame, while its construction is such as to provide a simple and readily accessible bearing.

Figure 1:
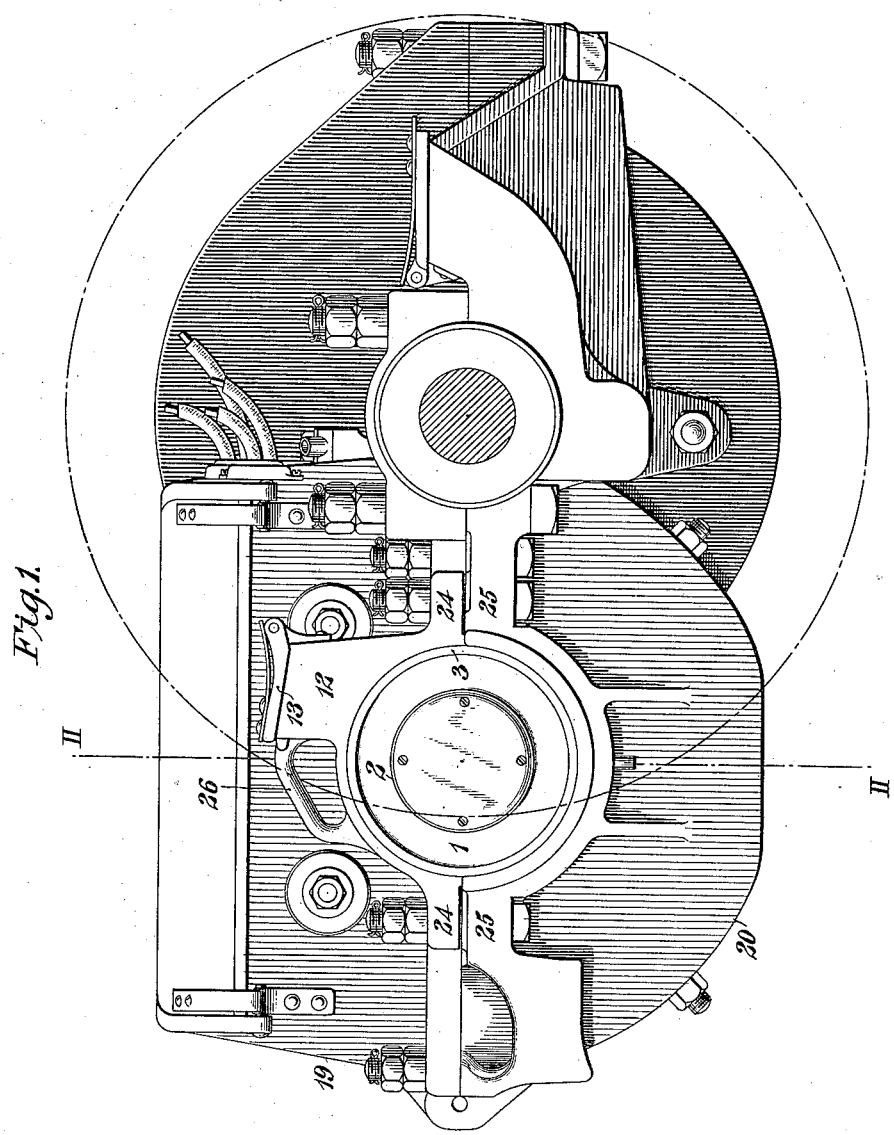
Figure 2:
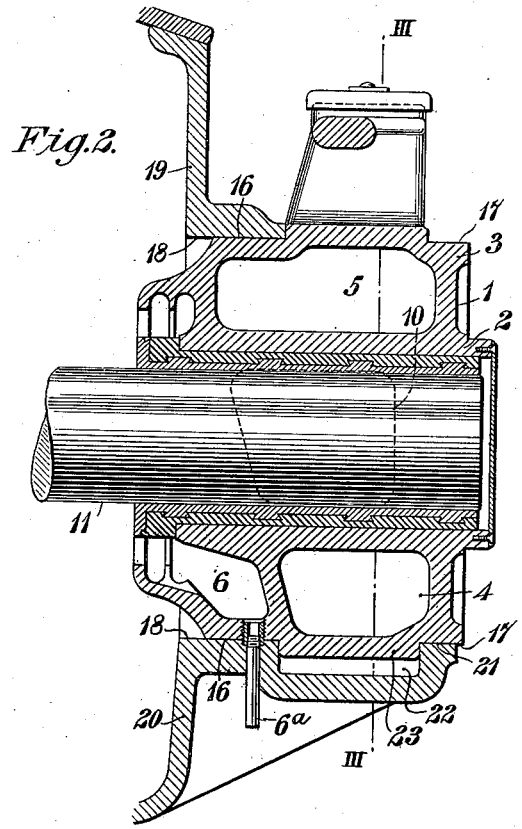
Figure 3:
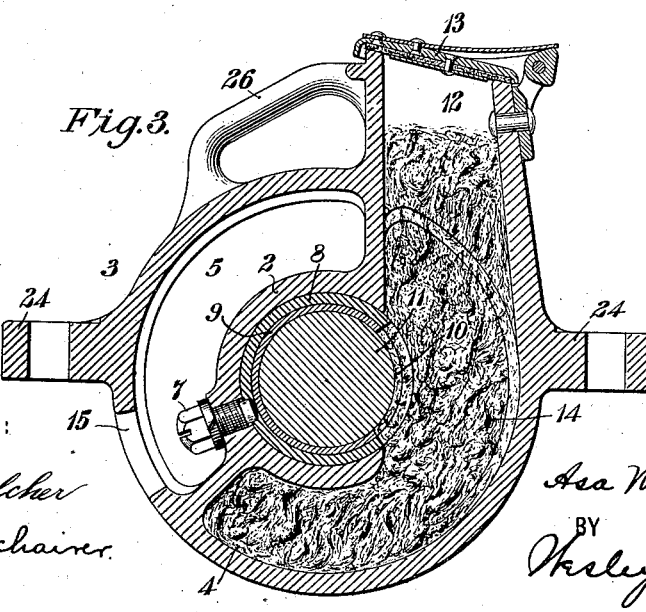

In the accompanying drawings, Figure 1 is a view, in end elevation, of an electric motor embodying and illustrating my invention; Fig. 2 is a sectional view of the axle bearing housing, the section being taken on line II—II of Fig. 1, and Fig. 3 is a view, in section, on line III—III of Fig. 2.

Referring now to the drawings, axle bearing housing 1 comprises two approximately cylindrical and concentric shells 2 and 3, between which are formed three chambers 4, 5 and 6. Pressed into the inner cylindrical shell 2 and secured therein by means of a set-screw 7, is a collar 8 having an inner facing 9 of any suitable bearing metal. In one side of the cylindrical shell 2, the collar 8 and the facing 9, is an opening 10 which exposes a corresponding portion of shaft 11. Communication with the exterior is provided for the chamber 4 by means of a vertical extension 12, the upper end of which may be ordinarily closed by means of a cover 13. The extension 12 constitutes a hand-hole through which cotton or wool waste 14 or any other suitable absorbent material may be introduced into the chamber 4 and subsequently saturated with any suitable liquid lubricant, the lubricant being applied to the shaft by the waste which is in contact therewith.

That portion of the chamber 4 which extends beneath the shaft 11 will, of course, retain any excess of lubricating liquid over what is retained by the body of waste and the latter will raise such liquid, by capillary attraction, as may be needed for lubricating the shaft. Inasmuch as the extension 12 and the major portion of the chamber 4 constitute a substantially vertical receptacle into one side of which the exposed portion of the shaft projects, normal use of the motor which tends to pack the waste more closely and densely within the chamber will also tend to maintain it in close contact with the exposed surface of the shaft. This function is important and valuable and, so far as I know, has not pertained to the devices of this general character which have been heretofore employed.

The chamber 5 is not utilized for any particular purpose, except that the set-screw 7 is located therein, communication from the exterior to the set-screw being afforded by a wrench-hole 15. The chamber 6 and a pipe 6ᵃ are provided for the purpose of collecting and draining off the waste oil which oozes out of the bearing and would ordinarily collect in the motor frame if such means were not provided for its removal.

On the outer surface of the shell 3, are two accurately finished cylindrical surfaces 16 and 17, the former of which engages with a corresponding surface 18 on the field magnet frame 19, and the latter of which is engaged by a corresponding surface 21 in the lower half 20 of the field magnet frame. A recess 22 is also provided in the lower half of the field magnet frame 20, into which fits a corresponding segmental portion 23 that serves to prevent movement of the bearing housing longitudinally of the shaft. Cast integral with the outer shell 3 of the bearing housing, are lugs 24, which constitute means for fastening the housing to the lower half 20 of the field magnet frame, clearance being provided between the lower surfaces of the lugs and the flanges 25 on the lower half 20 of the field magnet frame, so that the housing may be securely bolted in position regardless of whether it exactly fits the lower portion of the field magnet frame.

A handle 26 is cast integral with the outer, cylindrical shell 3 and constitutes means for handling the housing or for lifting the armature and its two bearings out of the field magnet frame. After the armature shaft has once been worn to its bearings, it is generally desirable and advantageous to retain the bearings in proper position with reference to the ends of the shaft, and in replacing an armature, to also replace the bearings and housings which are fitted to that armature.

From the description and drawings, it will be understood that an extremely simple shaft bearing has been provided, which affords efficient means for lubrication and which is easily accessible and that the housing is securely bolted in position without being dependent upon an accurate and rigid connection of the parts of the field magnet frame.

I claim as my invention:

1. A shaft bearing comprising a collar surrounding the shaft and having an opening in one side which exposes a relatively large portion of the shaft, and a one-piece housing comprising concentric shells of materially different diameters, the inner shell being provided with a side opening and with means for locking the collar in position to register said openings and the outer shell having a chamber which contains a lubricant and means for applying the lubricant to the shaft through said openings.

2. A shaft bearing comprising a collar surrounding the shaft and having an opening in one side which exposes the shaft and a housing comprising approximately concentric, cylindrical shells, the inner one being provided with a side opening and with means for securing the said collar in position to register said openings and the outer one having cylindrical surfaces and lugs for securing the housing in position.

3. A shaft bearing comprising a collar surrounding the shaft and having an opening in one side which exposes the shaft and a housing comprising approximately concentric, cylindrical shells, the inner one being provided with a side opening and with means for securing the said collar in position to register said openings and the outer one having cylindrical surfaces and lugs for securing the housing in position, and a chamber partially surrounding the inner shell and communicating with the said opening in the collar and having a hand-hole at the top.

4. A shaft bearing comprising a collar surrounding the shaft and having an opening in one side which exposes the shaft and a housing comprising approximately concentric, cylindrical shells, the inner one being provided with a side opening and with means for securing the said collar in position to register said openings and the outer one having cylindrical surfaces and lugs for securing the housing in position, a chamber partially surrounding the inner shell and communicating with the said opening in the collar and having a hand-hole at the top, and a second chamber provided to collect waste lubricant.

5. In an electric motor, the combination with a field magnet frame in two portions, of shaft-bearing housings each having two cylindrical surfaces which are engaged by corresponding surfaces in the lower portion of the field magnet frame and lugs integral with the housing for securing it to that portion, only one of the said cylindrical surfaces on each housing being engaged by the corresponding surfaces in the upper portion of the field magnet frame.

In testimony whereof, I have hereunto subscribed my name this 28th day of March, 1904.

ASA M. MATTICE.

Witnesses:
  WESLEY G. CARR,
  BIRNEY HINES.

---

Copies of this patent may be obtained for five cents each, by addressing the "Commissioner of Patents, Washington, D. C."